United States Patent [19]
Bott et al.

[11] Patent Number: 5,591,799
[45] Date of Patent: Jan. 7, 1997

[54] AQUEOUS EMULSION MATERIALS CONTAINING COPOLYMERIZED VINYL AMIDE MONOMERS AND HYDROLYSIS PRODUCTS THEREOF

[75] Inventors: Richard H. Bott, Macungie; Michael E. Ford, Coopersburg; William E. Lenney, Allentown, all of Pa.

[73] Assignee: Air Products and Chemicals, Inc., Allentown, Pa.

[21] Appl. No.: 398,025

[22] Filed: Mar. 3, 1995

[51] Int. Cl.$^6$ .................................................. C08L 39/00
[52] U.S. Cl. .................... 524/555; 524/812; 524/816; 525/328.2; 526/307.4; 526/307.8
[58] Field of Search .................. 524/555, 460, 524/812, 816; 525/328.2; 526/307.4, 307.8

[56] References Cited

U.S. PATENT DOCUMENTS

| | | | |
|---|---|---|---|
| 3,715,336 | 2/1973 | Nowak et al. | 525/60 |
| 4,255,548 | 3/1981 | Wingard et al. | 525/328 |
| 4,308,189 | 12/1981 | Moritani et al. | 525/59 |
| 4,647,611 | 3/1987 | Goldstein et al. | 524/458 |
| 4,668,748 | 5/1987 | Hardam et al. | 526/240 |
| 4,818,341 | 1/1989 | Degen | 162/168.2 |
| 4,843,118 | 6/1989 | Lai et al. | 524/555 |
| 4,921,621 | 5/1990 | Costello et al. | 252/8.513 |
| 4,957,977 | 9/1990 | Itagaki et al. | 525/328.4 |
| 4,988,762 | 1/1991 | Overbeek et al. | 524/839 |
| 5,086,111 | 2/1992 | Pinschmidt et al. | 525/61 |
| 5,326,809 | 7/1994 | Bott et al. | 524/459 |

*Primary Examiner*—Judy M. Reddick
*Attorney, Agent, or Firm*—Russell L. Brewer; William F. Marsh

[57] ABSTRACT

This invention pertains to aqueous emulsions containing water insoluble, vinyl polymer particles containing polymerized N-vinyl formamide (NVF) units converted to water insoluble vinyl acetate polymers containing cationic, amine functional units. These latex dispersions are prepared by the emulsion polymerization of an ethylenically unsaturated monomer and N-vinyl formamide. Preferably, vinyl acetate, optionally with other ethylenically unsaturated monomers, are used to form the copolymer. The copolymer then is selectively hydrolyzed via acid hydrolysis of the N-vinyl formamide group to form water insoluble polymer particles.

15 Claims, No Drawings

AQUEOUS EMULSION MATERIALS CONTAINING COPOLYMERIZED VINYL AMIDE MONOMERS AND HYDROLYSIS PRODUCTS THEREOF

TECHNICAL FIELD OF THE INVENTION

This invention relates to latex emulsions comprising hydrolyzed N-vinyl formamide units.

BACKGROUND OF THE INVENTION

Amine functional and cationic latex polymers have been the subject of a significant amount of research because of the anticipated advantages of these materials in several important application areas. Such polymers may well be suited for use as flocculation and paper additives, coatings and adhesives, etc. Only a few methods of incorporating reactive amine functionality into aqueous latex polymer compositions have been developed. The methods usually require specialized compositions and processes. The following patents describe various procedures for obtaining polymer compositions containing amine and amine/ester functionality.

U.S. Pat. No. 5,326,809 describes aqueous polymer emulsion compositions formed by the emulsion polymerization of unsaturated monomers stabilized with an amine functional water soluble polymer based on N-ethenyl formamide. The water soluble amine containing polymer is formed by the polymerization of vinyl acetate and N-vinyl formamide and the subsequent hydrolysis thereof.

U.S. Pat. No. 4,988,762 discloses aqueous self crosslinkable coating compositions based upon polymers formed by the polymerization of a vinyl monomer having carbonyl functional groups and amine precursor groups. Typically, the amine precursor groups are carboxyl, oxazoline or ketimine groups. Examples of carboxyl containing monomers include acrylic and methacrylic acid; maleic acid; oxazolines include 2-isopropenyl oxazoline; ethylenically unsaturated ketimines are derived by the reaction of a ketone with an amine followed by the reaction with an ethylenic derivative. The oxazolines and ketimines may be converted to amines via hydrolysis. The polymer may be prepared by emulsion polymerization.

U.S. Pat. No. 4,668,748 discloses crosslinkable amine functional polymers which are prepared by the solution copolymerization of an aromatic sulfonate monomer with an amide containing monomer in water. The amide is then transformed to the amine based on the reaction with a strong base and hypochlorite, known as the "Hofmann reaction." Polymers prepared according to this process can then be crosslinked by reaction with an aldehyde such as glutaraldehyde or formaldehyde.

U.S. Pat. No. 4,818,341 describes the beneficial properties which can be imparted to paper through the use of a primary amine functional water soluble polymer, optionally in conjunction with a modified starch polymer. The polymers are formed by polymerizing N-vinyl formamide alone or in conjunction with other monomers in amounts of up to about 25% by weight as solutions or water-in-oil emulsions followed by hydrolyzing N-vinyl formamide units. Hydrolysis is effected by contacting the polymer with an acid (mineral or organic) followed by neutralization with free base.

U.S. Pat. No. 4,957,977 discloses the preparation of vinylamine copolymers and their use as flocculating agents, paper additives, etc.. The polymers are prepared by polymerizing N-vinyl formamide using mass, solution or precipitation polymerization. The formamide groups are converted to amine groups by hydrolysis in acidic aqueous medium at temperatures from 40° to 100° C.

U.S. Pat. No. 3,715,336 discloses vinyl amine/vinyl alcohol copolymers prepared by the hydrolysis of a vinyl carbamate/vinyl acetate copolymer. These polymers, which are suited as flocculants for the clarification of aqueous suspensions and as wet strength agents for paper when combined with epichlorohydrin, are prepared by forming an interpolymer of an ethylenically unsaturated monomer and an alkyl N-vinyl carbamate. Interpolymers of vinyl acetate and the alkyl N-vinyl carbamate are converted to vinyl amine/vinyl alcohol copolymers by dissolving the copolymer in aqueous acid.

U.S. Pat. No. 4,255,548 discloses copolymers of ethylene and vinyl amine for use as flocculants for water clarification. The polymers are formed by polymerizing ethylene and N-vinyl acetamide in an alcohol medium. The resulting copolymer is then hydrolyzed by contacting the copolymer with a molar excess of aqueous mineral acid at temperatures of 75° C. and above.

U.S. Pat. No. 5,086,111 discloses the preparation of amine functional polymers containing acetal groups prepared by the hydrolysis of an N-vinyl formamide/vinyl acetate copolymer. Hydrolysis is effected by acid or base catalysis in methanol and water.

U.S. Pat. No. 4,921,621 discloses hydrolyzed copolymers of N-vinyl amide and acrylamide for use as water loss control additives and drilling muds. The copolymers are formed by polymerizing an N-vinyl amide, e.g., N-vinyl acetamide or N-vinyl formamide with acrylamide via inverse emulsion polymerization followed by hydrolysis of the copolymer in water at elevated temperatures ranging from 60° to 80° C. Either acid or base hydrolysis can be utilized.

SUMMARY OF THE INVENTION

This invention pertains to aqueous emulsions containing water insoluble, vinyl polymer particles containing polymerized N-vinyl formamide (NVF) units and particularly water insoluble vinyl acetate polymers containing cationic, amine functional units. These latex dispersions are prepared by the emulsion polymerization of an ethylenically unsaturated monomer and preferably N-vinyl formamide, optionally with other ethylenically unsaturated monomers, e.g., vinyl acetate, followed by the acid hydrolysis of the N-vinyl formamide water insoluble polymer particles.

There are several advantages and these include:
- an ability to produce water insoluble polymer particles containing N-vinyl formamide monomer incorporation in latex form and to transform the amide into an amine or ammonium group after emulsion polymerization has been completed;
- an ability to produce a latex containing water insoluble polymer which has excellent overall stability;
- an ability to form a latex containing water insoluble polymers having crosslinkability;
- an ability to form vinyl acetate copolymer latexes which incorporate vinyl amine units via the selective hydrolysis of a vinyl acetate/vinyl formamide polymer in latex form without apparent loss of emulsion stability;
- an ability to incorporate amine sites into a water insoluble polymer without addition of a diamine to a pre-existing latex, thus eliminating unwanted side reactions; and,
- an ability to obtain polymer particles having particular particle sizes and particular particle size distributions.

DETAILED DESCRIPTION OF THE INVENTION

It has been found that N-vinylformamide (NVF) can be effectively copolymerized with water insoluble comonomers by an emulsion polymerization process to generate amide functional latex polymers. These copolymers can then be selectively hydrolyzed to vinyl acetate/vinyl amine functional copolymers. Vinyl acetate/N-vinyl formamide and vinyl acetate/ethylene/N-vinyl formamide are representative copolymers which can be formed via emulsion polymerization. Typically, because N-vinyl formamide is water soluble it has been homopolymerized in aqueous solution or copolymerized with water insoluble monomers via organic solution or inverse water in oil processes. Conventional emulsion polymerization of N-vinyl formamide and the subsequent hydrolysis of the polymer is unique and it permits the formation of polymer systems having interesting properties.

Emulsion polymerization of ethylenically unsaturated monomers such as vinyl acetate is well known and the emulsion polymerization process can be used to form the unique copolymers here. Emulsion polymerization of N-vinyl formamide with ethylenically unsaturated monomers, and particularly vinyl acetate, is effected in an aqueous medium under pressures not exceeding 100 atmospheres in the presence of a catalyst and at least one emulsifying agent, the aqueous system being maintained by a suitable buffering agent, within a preselected pH range, typically within a pH of from about 4 to 6. The control of pH during polymerization is necessary in order to avoid premature hydrolysis. The emulsion polymerization process may be a batch process which involves a homogenization period in which a portion of the vinyl acetate is suspended in water and is thoroughly agitated in the presence of a comonomer such as ethylene while the vinyl acetate is gradually heated to polymerization temperature. The homogenization period is followed by a polymerization period during which the catalyst, which consists of a main catalyst or initiator, and an activator which are added incrementally. Alternatively, the emulsion polymerization process can rely on incremental addition of the monomers in order to produce a copolymer having a more uniform distribution of the comohomers. In that case, water and the stabilizing system are added to the reactor with the monomers being added incrementally (delay addition) over time. The catalyst system comprising the oxidizing agent and reducing agent are added to maintain a preselected reaction rate.

A variety of comonomers, e.g., ethylenically unsaturated monomers can be copolymerized with the vinyl acetate and N-vinyl formamide. For example, $C_1$–$C_{4-8}$ alkyl vinyl esters, $C_{1-18}$ esters and amides of acrylic acid and methacrylic acid, unsaturated carboxylic acids, nitriles and hydrocarbon monomers can be copolymerized with vinyl acetate and N-vinyl formamide to produce a variety of polymers. Examples of useful alkyl vinyl ethers are methyl vinyl ether, ethyl vinyl ether, isopropyl vinyl ether, n-propyl vinyl ether, tert;-butyl vinyl ether and n- and isobutyl vinyl ether. Examples of esters of acrylic acid and methacrylic acid include those which are derived from alcohols of 1 to 18 carbon atoms. Examples of suitable alcohols for the preparation of these esters are methanol, ethanol, propanol, isopropanol, n-, iso- and tert-butyl alcohol, neopentyl alcohol, 2-ethyl-hexanol, n-octanol, dodecanol, palmityl alcohol and stearyl alcohol. Preferably used acrylic esters are those derived from alcohols of 1 to 8 carbon atoms and include methyl methacrylate, butyl acrylate, and 2-ethylhexyl acrylate. Others include hydroxy esters which are prepared by esterifying a dihydric $C_2$–$C_4$-alcohol with acrylic acid or methacrylic acid in a molar ratio of 1:1; i.e., hydroxyethyl acrylate, hydroxyethyl methacrylate, hydroxypropyl acrylates, hydroxypropyl methacrylate, hydroxypropyl acrylates, hydroxypropyl methacrylates, hydroxybutyl acrylates and hydroxybutyl methacrylates. Examples of amides include acrylamide, methacrylamide, N-vinyl acetamide, N-methylol acrylamide, etc. while nitriles include acrylonitrile and methacrylonitrile. Examples of unsaturated acids include acrylic and methacrylic acid and crotonic acid. Ethylene is the preferred hydrocarbon monomer. Other suitable monomers include N-vinylpyrrolidone and triallylcyanurate. Esters of dicarboxylic acids such as esters of maleic fumaric, itaconic, etc. may be polymerized with the monomer $C_{6-12}$ alcohols are often used, e.g., dioctyl maleate, etc.

The preferred vinyl acetate/N-vinyl formamide copolymers contain from about 30 to 80% by weight of vinyl acetate and the balance being a comonomer in conjunction with the N-vinyl formamide. A preferred composition is a vinyl acetate/ethylene/N-vinyl formamide copolymer having from about 60 to 80% by weight vinyl acetate, 5–40%, more preferably 15–25% by weight ethylene and the balance being N-vinyl formamide. Possibly other comonomers, e.g., an acrylate, may be added or substituted, the sum of the percentages in the copolymers always being 100. Typically, the N-vinyl formamide concentration will be from about 1 to 20% preferably 2 to 15% by weight.

Various free-radical forming catalysts such as peroxide compounds can be used in carrying out the emulsion polymerization of the monomers. Combination-type catalysts employing both reducing agents and oxidizing agents can also be used. The use of this type of combined catalyst is generally referred to in the art as "redox polymerization" or "redox system." The reducing agent is also often referred to as an activator and the oxidizing agent as an initiator. Suitable reducing agents or activators include bisulfites, sulfoxylates, or other compounds having reducing properties such as ferrous salts, and tertiary aromatic amines, e.g., N,N-dimethylaniline. The oxidizing agents or initiators include hydrogen peroxide, organic peroxides such as benzoyl peroxide, t-butyl hydroperoxide and the like, persulfates, such as ammonium or potassium persulfate, perborates, and the like. A specific combination-type catalyst or redox system which can be used is hydrogen peroxide and sodium formaldehyde sulfoxylate.

The initiator is employed in the amount of 0.1 to 2%, preferably 0.25 to 0.75%, based on the weight of vinyl acetate introduced into the system. The activator is ordinarily added as an aqueous solution and the amount of activator is generally from 0.25 to 1 times the amount of initiator.

A wide variety of emulsifying agents can be used in emulsion polymerization. Nonionic, anionic and cationic surfactants can be used to stabilize the emulsion polymers. Since the reactive monomer is in a neutral form during the copolymerization, no special consideration is needed regarding the compatibility with the stabilizing medium chosen for the reaction. However, if further transformation of the amide monomer to the amine or ammonium form is desired, the correct choice of the surfactant or protective colloid during the emulsion copolymerization may be necessary.

Suitable non-ionic emulsifying agents include polyoxyethylene condensates. Polyoxyethylene condensates may be represented by the general formula:

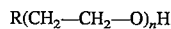

$R(CH_2-CH_2-O)_nH$ where R is the residue of a fatty alcohol containing 10–18 carbon atoms, an alkyl phenol, a fatty acid containing 10–18 carbon atoms, an amide, an amine, or a mercaptan, and where n is an integer of 1 or above. Some specific examples of polyoxyethylene condensates which can be used include polyoxyethylene aliphatic ethers such as polyoxyethylene lauryl ether, polyoxyethylene oleyl ether, polyoxyethylene hydroabietyl ether and the like; polyoxyethylene alkaryl ethers such as polyoxyethylene nonylphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and tall oil acids; polyoxyethylene amide and amine condensates such as N-polyoxyethylene lauramide, and N-lauryl-N-polyoxyethylene amine and the like; and polyoxyethylene thio-ethers such as polyoxyethylene n-dodecyl thio-ether.

One class of non-ionic emulsifying agents which can be used include a series of surface active agents known as "Pluronics." The "Pluronics" have the general formula:

where a, b, and c are integers of 1 or above. As b increases, the compounds become less water soluble or more oil soluble and thus more hydrophobic when a and c remain substantially constant.

Some examples of non-ionic emulsifying agents sold under the Pluronic trademark which can be used include polyoxyethylene-polyoxypropylene glycols conforming to the above general formula for "Pluronics" in which the polyoxypropylene chain has a molecular weight of 1500 to 1800 and the polyoxyethylene content is from 40 to 50 percent of the total weight of the molecule, a polyoxypropylene having a cloud point of about 140° F. and marketed under the trademark "Pluronic L-64,"; a polyoxyethylenepolyoxypropylene glycol conforming to the above general formula for "Pluronics" in which the polyoxypropylene chain has a molecular weight of 1500 to 1800 and the polyoxyethylene content is from 80 to 90 percent of the total weight of the molecule and having a cloud point of about 212° F. and marketed under the trade mark "Pluronic F-68". "Pluronics" are obtained by condensing ethylene oxide on the polyoxypropylene base and the hydrophobic-hydrophilic nature of the resulting compound is controlled by varying the molecular weight of either the hydrophobic base or the hydrophilic portion of the molecule.

Another class of nonionic surfactants are sold under the Igepal trademark. One example within this class is a polyoxyethylene nonylphenyl ether having a cloud point of between 126° and 133° F. and marketed under the trade mark "Igepal CO-630"; another is polyoxyethylene nonylphenyl ether having a cloud point above 212° F. and marketed under the trade mark "Igepal CO-887." A similar polyoxyethylene nonylphenyl ether with a cloud point of about 86° F. is marketed under the trade mark "Igepal CO-610." Surfactants similar to the Igepal surfactants include a polyoxyethylene octylphenyl ether having a cloud point of between 80° F. and 160° F. marketed under the trademark "Triton X-100", a polyoxyethylene oleyl ether having a cloud point of between 80° F. and 160° F. marketed under the trade mark "Atlas G-3915" and a polyoxyethylene lauryl ether having a cloud point above 190° F. marketed under the trademark "Brij 35."

A protective colloid also can be used in the polymerization mixture as a stabilizing agent. Various colloids and amounts conventionally used in emulsion polymerization can be incorporated into the latices as desired and in combination with the surfactants. Representative colloids which can be used include polyvinyl alcohol, partially-acetylated polyvinyl alcohol, e.g., up to 50% acetylated, casein, hydroxyethyl starch, carboxymethylcellulose, gum arabic, and the like.

The concentration range of the total amount of emulsifying agents used in emulsion polymerization is from 0.5 to 5% based on the aqueous phase of the latex regardless of the solids content. The stabilizers employed are, in part, governed by the use to which the copolymer latex is to be put. By utilizing appropriate levels of surfactant and/or protective colloid, one can obtain latex polymer particles having a variety of average particle size ranges and distributions.

In order to maintain the pH of the system at the desired value, there is suitably added an alkaline buffering agent of any convenient type. Any alkaline material which is compatible with the stabilizing agent can be used as the buffer. The amount of buffer is that sufficient to adjust the pH of the system within the desired range, e.g., 3.5 to 10 and preferably 4.5 and 8.5. Sodium acetate is the preferred buffer because of its compatibility with the system and its low cost. The amount of buffer is generally about 0.1 to 0.5% by weight, based on the monomers. Other buffers such as disodium phosphate, and the like, can, however, be used.

Reaction temperatures for emulsion polymerizing N-vinyl formamide along with vinyl acetate, for example, are conventional. The reaction temperature can be controlled by the rate of catalyst addition and by the rate of the heat dissipation therefrom. Generally, it is advantageous to maintain a temperature from about 50° to 70° C. and to avoid temperatures in excess of 80° C. While temperatures as low as 0° can be used, economically, the lower temperature limit is about 40° C.

The reaction time will also vary depending upon other variables such as the temperature, the catalyst, and the desired extent of the polymerization. It is generally desirable to continue the reaction until less than 0.5% of the NVF or vinyl acetate if emloyed remains unreacted. Under these circumstances, a reaction time of about 6 hours has been found to be generally sufficient for complete polymerization, but reaction times ranging from 3 to 10 hours have been used, and other reaction times can be employed, if desired.

Hydrolysis of an N-vinylformamide copolymer can be effected via contact with an acid. Care must be taken so as not to disturb the stability of the latex. Selective hydrolysis of an N-vinyl formamide vinyl ester latex can be achieved by contacting the latexes with an acid used heretofore for hydrolyzing N-vinyl formamide at temperatures below the instability point of the latex. Some vinyl esters such as vinyl acetate are easily hydrolyzed and care must be taken to limit hydrolysis to the amide with little hydrolysis of the acetate group. Typically, the latex is contacted with an acid at temperatures ranging from about 50° to 75° C. Acids suitable for effecting hydrolysis include mineral acids such as hydrochloric, sulfuric, nitric, phosphoric and other mineral acids commonly used as well as organic acids such as para-toluene sulfonic acid, methanesulfonic acid, oxalic acid and so forth. Acidic salts comprised of weak bases and strong acids, e.g., ammonium bisulfate, alkyl ammonium bisulfates such as tetrabutylammonium bisulfate can be used.

Concentrations of acids used for effecting hydrolysis range from about 0.2 to 3% by weight. Care also should be taken in terms of temperature and hydrolysis times during contact of these acids with the latex systems for reasons of latex stability. Organic acids such as para-toluenesulfonic acid, methanesulfonic acid and oxalic acid are preferred. Selective hydrolysis of the amide group to the amine group can be effected at low concentrations of acid, i.e., 1 to 2% by weight of the emulsion at temperatures of from 60° to 70° C. Conversion of the amide group can be accomplished in proportions of from 15 to in excess of 25% while less than 10% preferably only 2 to 5% of the vinyl acetate is hydrolyzed to the alcohol.

One common deficiency of the prior art processes which rely on copolymerization of a cationic or neutral substituted amine to generate amine functional polymers is the instability in conjunction with many stabilizing surfactants and protective colloids. Anionic surfactants widely used in emulsion polymerization and none of the cationic monomers generally would be expected to allow stable latices to be formed. This is believed due to charge neutralization and the resulting loss of surface activity. In addition, at many desirable pH ranges (in general, pH between 4.0 and 9.0) even many neutral amines which become cationically charged result in instability in the presence of anionic surfactants.

By the procedures described above, the chemical nature of the resulting secondary amide groups dictate that the major hydrolysis products of the copolymerized amide will be polymer bound (i.e. pendant) primary amine or amine salt, depending on the hydrolysis procedure employed. This characteristic is in contrast to the more common acrylamide monomers where hydrolysis of that primary amide results in a polymer having bound carboxylic acid. The nature of the N-vinyl formamide hydrolysis products, either the primary amine or amine salts, are more chemically versatile than other common tertiary amine monomers such as dimethylaminoethyl methacrylate or dimethylaminoethyl acrylamide where the amines are fully substituted as they are incorporated into the copolymer.

The following examples will illustrate some of the possible implementations of this invention but are not intended to be limiting. Examples 1–9 relate to the preparation of latex-containing polymer particles having polymerized NVF units, Examples 10 to 53 relate to the hydrolysis of the NVF polymer in latex form, and Examples 55 to 59 relate to the testing of such hydrolyzed NVF polymer.

EXAMPLE 1

Preparation of Vinyl Acetate/Ethylene/N-Vinyl Formamide Latex Using Reducing Agent To Control Reaction The emulsion was prepared utilizing five feeds and an initial charge to the reactor. The initial charge and the five additional feeds charged as a delay to the reactor are as follows:

| Initial Charge | |
|---|---|
| D.I. Water | 1100 gm |
| Igepal CO-887 (70% solids)[1] | 94.6 gm |
| Igepal CO-630 (100% solids)[2] | 38.3 gm |
| Sodium vinyl sulfonate (25% w/w solution) | 15.4 gm |
| Ferric Ammonium Sulfate (1% w/w solution) | 5 gm |
| t-butyl hydroperoxide (70% w/w solution) | 1.5 gm |
| Tartaric acid (50% w/w solution) | 0.15 gm |
| Vinyl acetate | 149 gm |
| Delay Feeds | |
| Delay Feed 1 | |
| Vinyl acetate | 1000 gm |
| Triallyl cyanurate | 1.3 gm |
| Delay Feed 2 | |
| Vinyl Acetate | 450 gm |
| N-vinyl formamide | 50 gm |
| Triallyl cyanurate | 0.6 gm |
| Delay Feed 3 | |
| D.I. Water | 398 gm |
| Maleic Anhydride | 25.9 gm |
| t-butyl hydroperoxide (70% w/w solution) | 10.2 gm |
| Sodium vinyl sulfonate (25% w/w solution) | 32.7 gm |
| Delay Feed 4 | |
| D.I. Water | 438.7 gm |
| Sodium Erythorbate | 11.3 gm |
| Tartaric acid (50% w/w solution) | 2.64 gm |
| Delay Feed 5 | |
| D.I. Water | 202.5 gm |
| Sodium Erythorbate | 22.5 gm |
| Tartaric acid (50% w/w solution) | 5.85 gm |

[1]Igepal CO-887 is a nonionic nonylphenol ethoxylate surfactant containing an average of 30 moles of ethylene oxide.
[2]Igepal CO-630 is a nonionic nonylphenol ethoxylate surfactant containing an average of 9 moles of ethylene oxide.

The polymerization was conducted as follows. First, the Igepal surfactant and water were added to a one gallon reactor and the pH of the initial charge solution containing the Igepal surfactant and water was adjusted to 4.4 using tartaric acid. The ferric ammonium sulfate solution was added, the solution stirred and the vinyl acetate charged. This reactor was pressured to 30 psig and purged twice with nitrogen. After equilibration for 30 minutes, the system was pressurized with 15 grams of ethylene at a temperature of 50° C. and allowed to equilibrate. The reaction was then initiated by the addition of the reducing agent solution (2.5% sodium erythorbate, delay feed 4) at a rate of 0.15 ml/min. When initiation was observed by a rise in temperature, the vinyl acetate (delay feed 1) and additional initiator (delay feed 3) were added at a rate of 8.3 ml/min and 0.8 ml/min., respectively. The reaction temperature was kept constant by adjusting the rate of addition of the reducing agent, (delay feed 4). After 2 hours, the vinyl acetate (delay feed 1) was stopped and the vinyl acetate/NVF monomer mixture (delay feed 2) was added at a rate of 4.5 ml/min. Simultaneously, the rate of addition of the reducing agent (delay feed 4) was increased to 0.25 ml/min. Ethylene was added to the reactor over 4 hours at a rate of approximately 1 g/min. over the course of the reaction. This ethylene addition resulted in a final reactor pressure of 800 psig.

After completion of the monomer delays, and, when the unreacted vinyl acetate was measured by titration at less than 3% (w/w), the concentrated reducing agent (delay feed 5) was added to the reactor at a rate of 0.3 ml/min. with the rate being increased to 0.67 ml/min. over the course of 15 min in order to reduce the unreacted vinyl acetate in the product. A total of 40 grams of this concentrated reducing agent solution was added. After the reaction was complete, the reaction mixture was transferred to a degasser to vent excess ethylene. A defoamer, Colloid 675 (0.5 g), was added to the degasser along with 45 grams of a 10% (w/w) hydrogen peroxide solution to effect polymerization of any residual monomer. At the end of the reaction, gas chromatography did not detect any unreacted NVF.

Approximately 230 grams of ethylene were added over the course of the reaction. The total addition of the various delay feeds was as follows: Delay 1, 928 gm; Delay 2, 495 gm; Delay 3, 375.7 gm; Delay 4, 270 gm; and Delay 5, 40 gm.

The product exhibited the following properties.

| % Solids | 46.5 |
|---|---|
| Viscosity/60 RPM | 130 cps |
| Tg | 12.2° C. |
| pH | 4.6 |

EXAMPLE 2

Preparation of Vinyl Acetate/Ethylene/N-Vinyl Formamide Latex Using Initiator to Control Rate of Reaction This procedure here is similar to Example 1 except that a higher and more uniform level of NVF incorporation was effected and reaction control was based on the rate of oxidizer addition rather than the rate of reducing agent addition.

| Initial Charge | |
|---|---|
| D.I. Water | 1100 gm |
| Igepal CO-887 (70% solids)[1] | 94.6 gm |
| Igepal CO-630 (100% solids)[2] | 38.3 gm |
| Sodium vinyl sulfonate (25% w/w solution) | 15.4 gm |
| Ferric Ammonium Sulfate (1% w/w solution) | 5 gm |
| Sodium Erythorbate | 2.0 gm |
| Tartaric acid (50% w/w solution) | 1.76 gm |
| Vinyl acetate | 149 gm |
| Sodium Acetate | 1.2 gm |
| Delay Feeds | |
| Delay Feed 1 | |
| Vinyl Acetate | 1350 gm |
| N-vinyl formamide | 150 gm |
| Triallyl cyanurate | 1.9 gm |
| Delay Feed 2 | |
| D.I. Water | 278.6 gm |
| Hydrogen Peroxide (35% solution) | 21.4 gm |
| Delay Feed 3 | |
| D.I. Water | 319.4 gm |
| Sodium Erythorbate | 8.8 gm |
| Sodium vinyl sulfonate (25% w/w solution) | 21.8 gm |
| Delay Feed 4 | |
| D.I. Water | 160.7 gm |
| Hydrogen Peroxide (35% solution) | 64.2 gm |

[1]Igepal CO-887 is a nonionic nonylphenol ethoxylate surfactant containing an average of 30 moles of ethylene oxide.
[2]Igepal CO-630 is a nonionic nonylphenol ethoxylate surfactant containing an average of 9 moles of ethylene oxide.

The polymerization was conducted as follows. First, the Igepal surfactant and water were added to a one gallon reactor and the pH of the initial charge solution containing the Igepal surfactant and water was adjusted to 4.4 using tartaric acid. The ferric ammonium sulfate solution was added, the solution stirred and the vinyl acetate charged. This reactor was pressured to 30 psig and purged twice with nitrogen. After equilibration for 30 minutes, the system was pressurized with 15 grams of ethylene at a temperature of 50° C. and allowed to equilibrate. The reaction was then initiated by the addition of the hydrogen peroxide solution (2.5% $H_2O_2$, delay Feed 2) at 0.2 ml/min. When initiation was observed by a rise in temperature, the vinyl acetate (delay feed 1) and the reducing agent (delay feed 3) were begun at 6.4 ml/min and 1.0 ml/min., respectively. The reaction temperature was kept constant through variation of the rate of addition of the initiator, delay feed 2. Ethylene was added to the reactor over 4.5 hours at a rate of approximately I g/min. over the course of the reaction. This addition resulted in a final reactor pressure of 800 psig.

After completion of the monomer delay, and when the unreacted vinyl acetate was measured by titration at less than 3% (w/w), the concentrated initiator (delay feed 4) was begun at a rate of 0.3 ml/min. with the rate being increased to 0.67 ml/min. over the course of 15 min. A total of 58.1 grams of this concentrated solution was added. The pH of the emulsion was adjusted to 5.2 through the addition of 9.2 gm of 14% ammonium hydroxide solution. Next, the reaction mixture was transferred to a degasser to vent excess ethylene and a defoamer, Colloid 675 (0.5 g), was added along with 20 grams of a 10% (w/w) hydrogen peroxide solution. At the end of the reaction, gas chromatography detected 400 ppm unreacted NVF. This residual monomer was reacted to an undetectable concentration by addition of 10 gm of 10% sodium erythorbate solution and 10 gm of 10% hydrogen peroxide solution.

Approximately 285 grams of ethylene were added over the course of the reaction. The total addition of the various delay feeds was as follows: Delay 1, 1423 gm; Delay 2, 160 gm; Delay 3, 240 gin; and Delay 4, 58.1 gm.

The product exhibited the following properties.

| % Solids | 52.1 |
|---|---|
| Viscosity/60 RPM | 360 cps |
| Tg | 12.0° C. |
| pH | 4.1 |

EXAMPLE 3

Preparation of Vinyl Acetate/Ethylene N-Vinyl Formamide Latex In The Presence of Polyvinyl Alcohol Protective Colloid This example demonstrates the incorporation of NVF into a latex emulsion stabilized with a polyvinyl alcohol (PVOH) protective colloid. The procedure of Example 2 was utilized.

| Initial Charge | |
|---|---|
| D.I. Water | 506.5 gm |
| Airvol 205 (10% solution)[1] | 530.6 gm |
| Airvol 523 (10% solution)[2] | 284.2 gm |
| Ferrous Ammonium Sulfate (1% w/w solution) | 3 gm |
| Acetic acid | 2.25 gm |
| Vinyl acetate | 1629 gm |
| Sodium Acetate | 2.0 gm |
| Delay Feeds | |
| Delay Feed 1 | |
| D.I. Water | 294 gm |
| Hydrogen Peroxide (35% solution) | 6.0 gm |
| Delay Feed 2 | |
| D.I. Water | 101.1 gm |
| Hydrogen Peroxide (35% solution) | 20.9 gm |
| Delay Feed 3 | |
| D.I. Water | 277.5 gm |
| Sodium formaldehyde sulfoxylate | 22.5 gm |
| Delay Feed 4 | |
| N-vinyl formamide | 50 gm |
| D.I. Water | 150 gm |

[1]Airvol 205 identifies a polyvinyl alcohol which is 87–89 mole % hydrolyzed; $M_w$ of 31,000–50,000
[2]Airvol 523 identifies a polyvinyl alcohol which is 87–89 mole % hydrolyzed; $M_w$ of 85,000–146,000

The process was conducted as follows. First, the pH of the initial charge solution containing the PVOH and water was adjusted to 4.5 using acetic acid. Then, the ferrous ammonium sulfate solution was added. The solution was stirred and the vinyl acetate charge added. After pressurizing to 30 psig and purging twice with nitrogen and once with ethylene, the reactor was pressurized with 270 grams of ethylene at a temperature of 38° C. and allowed to equilibrate. During the ethylene addition 7.0 mls. of delay feed 3, i.e., the reducing agent, were added. The reaction was then initiated by the addition of the hydrogen peroxide solution (0.7% $H_2O_2$, delay feed 1) and reducing agent, delay feed 3, at a rate of 0.1 ml/min. for both reagents. When initiation was observed by a rise in temperature, the NVF (delay feed 4) was begun at 0.80 ml/min. and the reducing agent (delay feed 3) was increased to 0.5 ml/min. The reaction temperature was ramped to 65° C. and maintained at that temperature through variation of the rate of initiator addition; 85 gm. of additional ethylene were added. When the monomer delay feed was finished and the unreacted vinyl acetate was measured at less than 3%, the concentrated initiator solution, delay feed 2, was begun at 1.0 ml/min. and the rate of reducing agent addition was increased to 1.0 ml/min. The pH of the emulsion was adjusted to 5.0 through the addition of 29 gm of 7% ammonium hydroxide solution. Next, the reaction mixture was transferred to a degasser to vent excess ethylene and a defoamer, Colloid 675 (2.4 g), was added along with 150 grams of an aqueous solution containing 7.8 gm of t-butyl hydroperoxide (70% solution), 3.7 gm of sodium citrate and 7.4 gm. of sodium acetate. The total addition of the various delay feeds was as follows: Delay 1, 170.4 gm; Delay 2, 57.0 gm; Delay 3, 114.0 gm; and Delay 4, 156.4 gm.

The product exhibited the following properties.

| % Solids | 50.6% |
|---|---|
| Viscosity/60 RPM | 190 cps |
| Tg | 9.9° C. |
| pH | 5.3 |

EXAMPLE 4

Preparation of Vinyl Acetate/Ethylene/N-Vinyl Formamide Latex In The Presence of An Anionic Surfactant This example demonstrates the incorporation of NVF into an emulsion stabilized with an anionic surfactant. The general procedure of Example 1 as utilized.

| Initial Charge | |
|---|---|
| D.I. Water | 850 gm |
| Polystep B-27 (30% Solution)[1] | 194 gm |
| Ferric Ammonium Sulfate (5% w/w solution) | 2.3 gm |
| Acetic acid | 3.01 gm |
| Vinyl acetate | 300 gm |
| Sodium Acetate | 0.9 gm |
| Delay Feeds | |
| Delay Feed 1 | |
| D.I. Water | 287.2 gm |
| t-butyl hydroperoxide (70% solution) | 12.8 gm |
| Delay Feed 2 | |
| D.I. Water | 277.5 gm |
| Sodium erythorbate | 22.5 gm |
| Delay Feed 3 | |
| D.I. Water | 223 gm |
| N-vinyl formamide | 96 gm |
| p-methoxyphenol (1% solution) | 1 gm |
| Delay Feed 4 | |
| vinyl acetate | 1200 gm |

[1] Sodium salt of nonylphenoxypolyethyleneoxyethanol sulfate containing approximately 4 moles of ethylene oxide.

The process was conducted as follows. First, the pH of the initial charge solution containing the surfactant and water was adjusted to 4.1 using acetic acid. Then, the ferric ammonium sulfate solution was added. The solution was stirred and the vinyl acetate charge added. After pressurizing to 30 psig and purging twice with nitrogen and once with ethylene, the reactor was pressurized with 240 grams of ethylene, heated to a temperature of 50° C. and allowed to equilibrate. During the ethylene addition, 15 mls. of the reducing agent, delay feed 2, were added. The reaction was initiated by the addition of the t-butyl hydroperoxide solution (3.0% tBHP, delay feed 1) at 0.4 ml/min. When initiation was observed by a rise in temperature, the N-vinyl formamide (delay feed 3) was begun at 1.17 ml/min. and the reducing agent (delay feed 2) was begun at 0.2 ml/min. The vinyl acetate, delay feed 4, was started at 6.7 gm/min. The reaction temperature was 50° C. and maintained through variation of the rate of initiator addition.

When the monomer delay feed was finished and the unreacted vinyl acetate was measured at less than 2%, the contents of the reactor were transferred to a degasser and 2.0 gm of defoamer (Foammaster VF) was added.

Approximately, 162 gm. of additional ethylene were added. The total addition of the various delay feeds was as follows: Delay 152 gm; Delay 2, 136 gm; Delay 3, 281 gm; and Delay 4, 1200 gm. The pH of the emulsion was 4.8.

The product exhibited the following properties.

| % Solids | 58.2% |
|---|---|
| Viscosity/60 RPM | 7450 cps |
| Tg | 4.4° C. |
| pH | 4.9 |

EXAMPLE 5

Preparation of Vinyl acetate/Ethylene/NVF/10 Carbon Ester Terpolymer

This purpose of this example was to produce a terpolymer of vinyl acetate-ethylene-NVF-VeoVA-10. This polymer employs an unsaturated ester which was more resistant to hydrolysis than vinyl acetate should the vinyl acetate be hydrolyzed during the hydrolysis of the N-vinyl formamide in the N-vinyl formamide polymer.

| Initial Charge | |
|---|---|
| D.I. Water | 1100 gm |
| Igepal CO-887 (70% solids)[1] | 94.6 gm |
| Igepal CO-630 (100% solids)[2] | 38.3 gm |
| Sodium vinyl sulfonate (25% w/w solution) | 15.4 gm |
| Ferric Ammonium Sulfate (1% w/w solution) | 5 gm |
| Sodium Erythorbate | 2.0 gm |
| Tartaric acid (50% w/w solution) | 0.62 gm |
| Vinyl acetate | 149 gm |
| Sodium Acetate | 1.2 gm |
| Delay Feeds | |
| Delay Feed 1 | |
| Vinyl Acetate | 900 gm |
| VeoVA-10[3] | 600 |
| N-vinyl formamide | 0 gm |
| Triallyl cyanurate | 1.9 gm |
| Delay Feed 2 | |
| D.I. Water | 278.6 gm |
| Hydrogen Peroxide (35% solution) | 21.4 gm |
| Delay Feed 3 | |
| D.I. Water | 319.4 gm |
| Sodium Erythorbate | 8.8 gm |
| Sodium vinyl sulfonate (25% w/w solution) | 21.8 gm |

-continued

| Delay Feed 4 | | |
|---|---|---|
| D.I. Water | 160.7 | gm |
| Hydrogen Peroxide (35% solution) | 64.2 | gm |

[1] Igepal CO-887 is a nonionic nonylphenol ethoxylate surfactant containing an average of 30 moles of ethylene oxide.
[2] Igepal CO-630 is a nonionic nonylphenol ethoxylate surfactant containing an average of 9 moles of ethylene oxide.
[3] VeoVA-10 vinyl versitate identifies a vinyl ester of a 10 carbon neo-acid marketed by Union Carbide.

The process was conducted as follows. First, the pH of the initial charge solution containing the Igepal surfactant and water was adjusted to 4.5 using tartaric acid. Then, the ferric ammonium sulfate solution was added, the solution stirred and the vinyl acetate charge added. After pressurizing to 30 psig and purging twice with nitrogen and once with ethylene, the system was pressurized to 450 psig with ethylene, heated to a temperature of 50° C. and allowed to equilibrate. The reaction was then initiated by the addition of the hydrogen peroxide solution (2.5% $H_2O_2$, delay feed 2) at 0.2 ml/min. When initiation was observed by a rise in temperature, the vinyl acetate (delay feed 1) and the reducing agent (delay feed 3) were begun at 6.4 ml/min and 1.0 ml/min., respectively. The reaction temperature was kept constant through variation of the rate of addition of the initiator, delay feed 2. An additional amount of ethylene was added to the reactor during the polymerization.

After completion of the monomer delay, and when the unreacted vinyl acetate was measured by titration at less than 3% (w/w), the concentrated initiator (delay feed 4) was begun at a rate of 0.3 ml/min. with the rate being increased to 0.67 ml/min. over the course of 15 min. A total of 40 grams of this concentrated solution was added. The pH of the emulsion was adjusted to 6.2 through the addition of 9.5 gm of 14% ammonium hydroxide solution. Next, the reaction mixture was transferred to a degasser to vent excess ethylene and a defoamer, Colloid 675 (2.4 g), was added along with 45 grams of a 10% (w/w) hydrogen peroxide solution.

Approximately 185 gm of ethylene were added to the reaction. The total addition of the various delay feeds was as follows: Delay 1, 1224 gm; Delay 2, 45.1 gm; Delay 3, 205 gm; and Delay 4, 40 gm.

The product exhibited the following properties.

| % Solids | 52.4 |
|---|---|
| Viscosity/60 RPM | 730 cps |
| Tg | 2.4° C. |
| pH | 4.1 |

EXAMPLE 6

Preparation of Tetrapolymer Vinyl Acetate-ethylene-VeoVA-10-NVF Latex

This example is similar to Example 5 and demonstrates the preparation of a tetrapolymer of vinyl acetate-ethylene-VeoVA-10-NVF.

| Initial Charge | | |
|---|---|---|
| D.I. Water | 1100 | gm |
| Igepal CO-887 (70% solids)[1] | 94.6 | gm |
| Igepal CO-630 (100% solids)[2] | 38.3 | gm |
| Sodium vinyl sulfonate (25% w/w solution) | 15.4 | gm |
| Ferric Ammonium Sulfate (1% w/w solution) | 5 | gm |
| Sodium Erythorbate | 2.0 | gm |
| Tartaric acid (50% w/w solution) | 0.62 | gm |
| Vinyl acetate | 149 | gm |
| Sodium Acetate | 1.2 | gm |
| Delay Feeds | | |
| Delay Feed 1 | | |
| Vinyl Acetate | 800 | gm |
| VeoVA-10[3] | 600 | |
| N-vinyl formamide | 100 | gm |
| Triallyl cyanurate | 1.9 | gm |
| Delay Feed 2 | | |
| D.I. Water | 278.6 | gm |
| Hydrogen Peroxide (35% solution) | 21.4 | gm |
| Delay Feed 3 | | |
| D.I. Water | 319.4 | gm |
| Sodium Erythorbate | 8.8 | gm |
| Sodium vinyl sulfonate (25% w/w solution) | 21.8 | gm |
| Delay Feed 4 | | |
| D.I. Water | 160.7 | gm |
| Hydrogen Peroxide (35% solution) | 64.2 | gm |

[1] Igepal CO-887 is a nonionic nonylphenol ethoxylate surfactant containing an average of 30 moles of ethylene oxide.
[2] Igepal CO-630 is a nonionic nonylphenol ethoxylate surfactant containing an average of 9 moles of ethylene oxide.
[3] VeoVA-10 is a vinyl ester of a 10 carbon neo-acid marketed in the United States by Union Carbide.

The process was conducted in a manner similar to Example 5 as follows. First, the pH of the initial charge solution containing the Igepal surfactant and water was adjusted to 4.5 using tartaric acid. The ferric ammonium sulfate solution was then added and the premix was then charged to a one gallon reactor. The solution was stirred and the vinyl acetate charge added. The reactor was pressurized to 30 psig and purged twice with nitrogen and once with ethylene. After equilibration for 30 minutes, the system was pressurized to 450 psig with ethylene and heated to a temperature of 50° C. and again allowed to equilibrate. The reaction was then initiated by the addition of the hydrogen peroxide solution (2.5% $H_2O_2$, delay feed 2) at 0.2 ml/min. When initiation was observed by a rise in temperature, the vinyl acetate (delay feed 1) and the reducing agent (delay feed 3) were begun at 6.4 ml/min and 1.0 ml/min., respectively. The reaction temperature was kept constant through variation of the rate of addition of the initiator, delay feed 2. An additional amount of ethylene was added to the reactor during the polymerization.

After completion of the monomer delay, and when the unreacted vinyl acetate was measured by titration at less than 3% (w/w), the concentrated initiator (delay feed 4) was begun at a rate of 0.3 ml/min. with the rate being increased to 0.67 ml/min. over the course of 15 min. A total of 40 grams of this concentrated solution was added. The pH of the emulsion was adjusted to 5.2 through the addition of 11.8 gm of 14% ammonium hydroxide solution. Next, the reaction mixture was transferred to a degasser to vent excess ethylene and a defoamer, Colloid 675 (2.4 g), was added along with 45 grams of a 10% (w/w) hydrogen peroxide solution.

Approximately 268 gm of ethylene were added. The total addition of the various delay feeds was as follows: Delay 1, 1423 gm; Delay 2, 277 gm; Delay 3, 336 gm; and Delay 4, 40 gm.

The product exhibited the following properties.

| | |
|---|---|
| % Solids | 49.2 |
| Viscosity/60 RPM | 880 cps |
| Tg | −4.7° C. |
| pH | 4.1 |

COMPARATIVE EXAMPLE 7

Preparation of Vinyl acetate and Ethylene Copolymer Latex

This is a comparative example prepared using only vinyl acetate and ethylene.

| Initial Charge | |
|---|---|
| D.I. Water | 1100 gm |
| Igepal CO-887 (70% solids)[1] | 94.6 gm |
| Igepal CO-630 (100% solids)[2] | 38.3 gm |
| Sodium vinyl sulfonate (25% w/w solution) | 15.4 gm |
| Ferric Ammonium Sulfate (1% w/w solution) | 5 gm |
| Sodium Erythorbate | 2.0 gm |
| Tartaric acid (50% w/w solution) | 0.64 gm |
| Vinyl acetate | 149 gm |
| Sodium Acetate | 0.5 gm |
| Delay Feeds | |
| Delay Feed 1 | |
| Vinyl Acetate | 1500 gm |
| Triallyl cyanurate | 1.9 gm |
| Delay Feed 2 | |
| D.I. Water | 278.6 gm |
| Hydrogen Peroxide (35% solution) | 21.4 gm |
| Delay Feed 3 | |
| D.I. Water | 319.4 gm |
| Sodium Erythorbate | 8.8 gm |
| Sodium vinyl sulfonate (25% w/w solution) | 21.8 gm |
| Delay Feed 4 | |
| D.I. Water | 160.7 gm |
| Hydrogen Peroxide (35% solution) | 64.2 gm |

[1]Igepal CO-887 is a nonionic nonylphenol ethoxylate surfactant containing an average of 30 moles of ethylene oxide.
[2]Igepal CO-630 is a nonionic nonylphenol ethoxylate surfactant containing an average of 9 moles of ethylene oxide.

The process was conducted in accordance with the procedure of Example 2 as follows. First, the pH of the initial charge solution containing the Igepal surfactant and water was adjusted to 4.5 using tartaric acid. The ferric ammonium sulfate solution was then added, the solution stirred and the vinyl acetate charge added. The reactor was pressurized to 30 psig and purged twice with nitrogen and once with ethylene. After equilibration for 30 minutes, the system was pressurized to 750 psig with ethylene, heated to a temperature of 50° C. and allowed to equilibrate. The reaction was then initiated by the addition of the hydrogen peroxide solution (2.5% $H_2O_2$, delay feed 2) at 0.2 ml/min. When initiation was observed by a rise in temperature, the vinyl acetate (delay feed 1) and the reducing agent (delay feed 3) were begun at 6.4 ml/min and 1.0 ml/min., respectively. The reaction temperature was kept constant through variation of the rate of addition of the initiator, delay feed 2. An additional amount of ethylene was added to the reactor during the polymerization.

After completion of the monomer delay and when the unreacted vinyl acetate was measured by titration at less than 3% (w/w), the concentrated initiator (delay feed 4) was begun at a rate of 0.3 ml/min. with the rate being increased to 0.67 ml/min. over the course of 15 min. A total of 40 grams of this concentrated solution was added. The pH of the emulsion was adjusted to 5.4 through the addition of 9.3 gm of 14% ammonium hydroxide solution. Next, the reaction mixture was transferred to a degasser to vent excess ethylene and a defoamer, Colloid 675 (2.4 g), was added along with 45 grams of a 10% (w/w) hydrogen peroxide solution.

Approximately 488 gm of ethylene were added. The total addition of the various delay feeds was as follows: Delay 1, 1423 gm; Delay 2, 69.8 gm; Delay 3, 240 gm; and Delay 4, 40 gm.

The product exhibited the following properties.

| | |
|---|---|
| % Solids | 57.6 |
| Viscosity/60 RPM | 140 cps |
| Tg | −6.4° C. |
| pH | 3.8 |

EXAMPLE 8

Preparation of Vinyl Acetate/Ethylene/N-vinyl formamide Latex

This example demonstrates the preparation of a terpolymer of vinyl acetate, ethylene and NVF.

| Initial Charge | |
|---|---|
| D.I. Water | 1100 gm |
| Igepal CO-887 (70% solids)[1] | 94.6 gm |
| Igepal CO-630 (100% solids)[2] | 38.3 gm |
| Sodium vinyl sulfonate (25% w/w solution) | 15.4 gm |
| Ferric Ammonium Sulfate (1% w/w solution) | 5 gm |
| Sodium Erythorbate | 2.0 gm |
| Tartaric acid (50% w/w solution) | 0.62 gm |
| Vinyl acetate | 149 gm |
| Sodium Acetate | 0.5 gm |
| Delay Feeds | |
| Delay Feed 1 | |
| Vinyl Acetate | 1350 gm |
| N-vinyl formamide | 150 gm |
| Triallyl cyanurate | 1.9 gm |
| Delay Feed 2 | |
| D.I. Water | 278.6 gm |
| Hydrogen Peroxide (35% solution) | 21.4 gm |
| Delay Feed 3 | |
| D.I. Water | 319.4 gm |
| Sodium Erythorbate | 8.8 gm |
| Sodium vinyl sulfonate (25% w/w solution) | 21.8 gm |
| Delay Feed 4 | |
| D.I. Water | 160.7 gm |
| Hydrogen Peroxide (35% solution) | 64.2 gm |

[1]Igepal CO-887 is a nonionic nonylphenol ethoxylate surfactant containing an average of 30 moles of ethylene oxide.
[2]Igepal CO-630 is a nonionic nonylphenol ethoxylate surfactant containing an average of 9 moles of ethylene oxide.

The process was conducted in accordance with the procedure of Example 5, as follows. Approximately 318 gm of ethylene were added. The total addition of the various delay feeds was as follows: Delay 1, 1423 gm; Delay 2, 259 gm; Delay 3, 240 gm; and Delay 4, 115 gm.

The product exhibited the following properties.

| % Solids | 48.6 |
|---|---|
| Viscosity/60 RPM | 65 cps |
| Tg | 7.4° C. |
| pH | 4.4 |

EXAMPLE 9

Preparation of Terpolymer of Vinyl Acetate, Ethylene and NVF Latex Using t-Butylhydroperoxide as Initiator This example demonstrates the preparation of a terpolymer of vinyl acetate-ethylene and NVF using t-butylhydroperoxide as an initiator.

| Initial Charge | |
|---|---|
| D.I. Water | 1100 gm |
| Igepal CO-887 (70% solids)[1] | 94.6 gm |
| Igepal CO-630 (100% solids)[2] | 38.3 gm |
| Sodium vinyl sulfonate (25% w/w solution) | 15.4 gm |
| Ferric Ammonium Sulfate (1% w/w solution) | 5 gm |
| Sodium Erythorbate | 2.0 gm |
| Tartaric acid (50% w/w solution) | 0.40 gm |
| Vinyl acetate | 149 gm |
| Sodium Acetate | 0.9 gm |
| Delay Feeds | |
| Delay Feed 1 | |
| Vinyl Acetate | 1265.5 gm |
| N-vinyl formamide | 234.5 gm |
| Triallyl cyanurate | 1.9 gm |
| Delay Feed 2 | |
| D.I. Water | 282.8 gm |
| t-butyl hydroperoxide (70% solution) | 17.2 gm |
| Sodium vinyl sulfonate (25% w/w solution) | 22 gm |
| Delay Feed 3 | |
| D.I. Water | 296.7 gm |
| Sodium formaldehyde sulfoxylate | 31.5 gm |
| Delay Feed 4 | |
| D.I. Water | 192.8 gm |
| t-butyl hydroperoxide (70% solution) | 32.1 gm |

[1]Igepal CO-887 is a nonionic nonylphenol ethoxylate surfactant containing an average of 30 moles of ethylene oxide.
[2]Igepal CO-630 is a nonionic nonylphenol ethoxylate surfactant containing an average of 9 moles of ethylene oxide.

The process was conducted in accordance with the procedure of Example 5. Approximately 350 gm of ethylene were added. The total addition of the various delay feeds was as follows: Delay 1, 1415 gm; Delay 2, 418 gm; Delay 3, 564 gm; and Delay 4, 0 gm.

The product exhibited the following properties.

| % Solids | 48.1 |
|---|---|
| Viscosity/60 RPM | 160 cps |
| Tg | 13.0° C. |
| pH | 5.3 |

EXAMPLES 10–53

HYDROLYSIS OF NVF POLYMER EMULSIONS

The following general procedure was used to effect hydrolysis of the NVF polymer emulsions. The expression VAE refers to vinyl acetate/ethylene.

General Procedure—Hydrolysis of VAE-NVF Emulsions

The desired emulsion (50 ml) was added to a 100 ml three-necked round bottom flask equipped with a thermometer and an overhead stirrer. The appropriate quantity of hydrolyzing agent was added. The contents were stirred and the mixture heated to a preselected desired temperature. Owing to the cloud point of many of the surfactants used in preparing the emulsion, hydrolyses were not carried out at temperatures >80° C. After hydrolysis was deemed complete, the contents were cooled to room temperature thus providing the hydrolyzed emulsion. Samples were analyzed by ion chromatography and hydrolysis selectivity for formamide and vinyl acetate (VOAc) calculated.

General Calculation—Extent of Emulsion Hydrolysis

Ion chromatography provides data for the concentrations of formate and acetate in the hydrolysis product. To relate these to the starting polymers, the following calculations were used.

· NVF Hydrolysis via Formate Analysis:

IC Analysis (wt %)/Wt % solids in starting emulsion=IC analysis (dry basis; wt %)

IC Analysis (dry; wt %)/Equivalent wt formate=Equivalents of formate/100 gm polymer

[Eq of formate/100 gm]/[Eq NVF/100 gm starting polymer]×100=Extent of hydrolysis Analogous calculations were carried out to determine the extent of VOAc hydrolysis. Table 1 sets forth the initial composition of the emulsions to be hydrolyzed.

TABLE 1

| | Composition of VAE-NVF Emulsions | | | | |
|---|---|---|---|---|---|
| Emulsion Example | Wt % Solids | Wt % NVF[a] | Wt % VOAc[a] | Eq NVF/ 100 gm[b] | Eq VOAc/ 100 gm[b] |
| 5 | 52.4 | 0 | 56.3 | 0 | 0.6546 |
| 6 | 49.2 | 5.2 | 49.3 | 0.0732 | 0.5733 |
| 7 | 57.6 | 0 | 76.3 | 0 | 0.8872 |
| 8 | 48.6 | 7.5 | 75.6 | 0.1056 | 0.8791 |
| 9 | 48.1 | 12.1 | 73.6 | 0.1704 | 0.8558 |

Notes to Table
[a]Dry weight basis.
[b]Equivalent weight of the monomer/100 gm of emulsion (dry weight basis); calculated by division of the weight percent of that monomer (dry weight basis) by its molecular weight.

EXAMPLES 10–27

Hydrolysis of Vinyl Acetate/Ethylene/N-vinyl Formamide

Hydrolysis of Emulsions 5 and 6 were carried out in accordance with the general procedure using preselected acids. Table 2 sets forth the conditions and results.

TABLE 2

Hydrolysis of Vinyl Versatate - Containing Emulsions
Examples 10–27

| Example | Emulsion Example | Reagent (wt %)[a] | T° (C.) | t (hr) | Hydrolysis[b] NVF | VOAc | Stable |
|---|---|---|---|---|---|---|---|
| 10 | 5 | None | 80 | 3 | — | 1.8 | Y |
| 11 | 6 | None | 60 | 3 | 3.4 | 1.1 | Y |
| 12 | 6 | None | 80 | 3 | 3.7 | 1 | N |
| 13 | 6 | Oxalic Acid (0.2) | 70 | 3 | 2.3 | 1.8 | Y |
| 14 | 6 | Oxalic Acid (0.5) | 70 | 3 | 5.2 | 1.9 | Y |
| 15 | 6 | Oxalic Acid (1) | 70 | 3 | 10.6 | 2.2 | Y |
| 16 | 6 | Oxalic Acid (2) | 60 | 3 | 11.3 | 2.6 | Y |
| 17 | 6 | Oxalic Acid (2) | 70 | 3 | 18.0 | 3.0 | Y |
| 18 | 6 | Methanesulfonic Acid (0.2) | 60 | 3 | 4.3 | 2.8 | Y |
| 19 | 6 | Methanesulfonic Acid (0.5) | 60 | 3 | 11.5 | 3.9 | Y |
| 20 | 6 | Methanesulfonic Acid (1) | 60 | 3 | 21.6 | 4.4 | Y |
| 21 | 6 | Ammonium Bisulfate (0.5) | 60 | 3 | 8.7 | 3.0 | Y |
| 22 | 6 | Ammonium Bisulfate (1) | 60 | 3 | 14.8 | 3.9 | Y |
| 23 | 6 | Ammonium Bisulfate (2) | 60 | 3 | 24.1 | 4.1 | Y |
| 24 | 6 | Ammonium Bisulfate (1) | 70 | 3 | 15.5 | 3.6 | N |
| 25 | 5 | Methanesulfonic Acid (1) | 60 | 3 | — | 3.8 | Y |
| 26 | 5 | Oxalic Acid (2) | 70 | 3 | — | 4.1 | Y |
| 27 | 5 | Ammonium Bisulfate (2) | 60 | 3 | — | 3.3 | Y |

Notes to Table
[a]Weight % reagent, based on 50 ml sample. (See procedures for additional detail.)
[b]Extent of hydrolysis of each copolymerized monomer, expressed as equivalence %/100 gm of emulsion.

The results show that substantial hydrolysis of the amide group could be effected without effecting substantial hydrolysis of the acetate group while retaining stability of the emulsion. Except for Run 24, all of the emulsions were stable when hydrolyzed at 70° C. and below. In the column "Stable", Y indicates yes for stable and N indicates no for stable. Stability is determined by fluidity and lack of coagulum formed during the hydrolysis process.

EXAMPLES 28–53

Hydrolysis of Vinyl Acetate-Ethylene-NVF-Emulsions

The procedure used in Example 10–27 was followed except that Emulsions 7–9 were used. Table 3 sets forth the conditions and results.

TABLE 3

Hydrolysis of Vinyl Acetate - Ethylene - NVF Emulsions

| Example | Emulsion Example | Reagent (wt %)[a] | T° (C.) | t (hr) | Hydrolysis[b] NVF | VOAc | Stable |
|---|---|---|---|---|---|---|---|
| 28 | 7 | None | 70 | 3 | — | 3.6 | Y |
| 29 | 8 | None | 70 | 3 | 4.5 | 4.2 | Y |
| 30 | 9 | None | 70 | 3 | 0.5 | 1.0 | Y |
| 31 | 8 | Oxalic Acid (1) | 70 | 3 | 9.3 | 4.1 | Y |
| 32 | 8 | Oxalic Acid (2) | 70 | 3 | 17.7 | 4.8 | N |
| 33 | 8 | Oxalic Acid (2) | 60 | 3 | 14.5 | 4.4 | Y |
| 34 | 8 | Oxalic Acid (2) | 60 | 5 | 17.1 | 4.8 | Y |
| 35 | 8 | Oxalic Acid (1) | 70 | 5 | 10.3 | 2.4 | Y |
| 36 | 8 | Oxalic Acid (4) | 60 | 5 | 25.7 | 3.9 | Y |
| 37 | 8 | Ammonium Bisulfate (1) | 70 | 3 | c | c | N |
| 38 | 8 | Ammonium Bisulfate (1) | 65 | 3 | c | c | N |
| 39 | 8 | Ammonium Bisulfate (1) | 60 | 3 | c | c | N |
| 40 | 8 | Triethylenediamine (1) | 60 | 3 | 4.5 | 4.1 | Y |
| 41 | 8 | Methanesulfonic Acid (2) | 60 | 5 | 23.1 | 4.9 | Y |
| 42 | 8 | Tetrabutylammonium Bisulfate (3) | 50 | 5 | 9.8 | 2.5 | Y |
| 43 | 8 | Tetrabutylammonium | 70 | 3 | 9.6 | 2.7 | Y |

TABLE 3-continued

Hydrolysis of Vinyl Acetate - Ethylene - NVF Emulsions

| Emulsion | | | | | Hydrolysis[b] | | |
|---|---|---|---|---|---|---|---|
| Example | Example | Reagent (wt %)[a] | T° (C.) | t (hr) | NVF | VOAc | Stable |
| | | Bisulfate (3) | | | | | |
| 44 | 9 | Oxalic Acid (1) | 70 | 3 | 7.5 | 2.1 | Y |
| 45 | 9 | Oxalic Acid (2) | 60 | 5 | 11.9 | 3.2 | Y |
| 46 | 9 | Oxalic Acid (4) | 60 | 5 | 15.2 | 3.5 | Y |
| 47 | 9 | Oxalic Acid (1) | 70 | 5 | 7.4 | 2.5 | Y |
| 48 | 9 | Methanesulfonic Acid (2) | 60 | 5 | 14.8 | 4.0 | Y |
| 49 | 9 | Ammonium Bisulfate (1) | 70 | 3 | 7.2 | 1.8 | Y |
| 50 | 9 | Tetrabutylammonium Bisulfate (3) | 50 | 5 | 7.3 | 2.3 | Y |
| 51 | 9 | Tetrabutylammonium Bisulfate (3) | 70 | 3 | 8.0 | 2.1 | Y |
| 52 | 9 | Triethylenediamine (1) | 60 | 3 | 1.5 | 1.6 | Y |
| 53 | 9 | Triethylenediamine (6) | 70 | 3 | 2.6 | 2.7 | Y |

Notes to Table
[a]Weight % reagent, based on 50 ml sample. (See procedures for additional detail.)
[b]Extent of hydrolysis of each copolymerized monomer, expressed as equivalence %/100 gm of emulsion.
[c]Not analyzed, owing to rapid gellation of hydrolysis product.

The results show excellent stability of the emulsion when hydrolysis was effected below about 70° C. Emulsion 8 appeared to be sensitive to ammonium bisulfate at the 1% level while Emulsion 9 was not. Emulsion 9 was prepared with an oil soluble initiator while Emulsion 8 was prepared with a water soluble initiator. But, that should not account for the instability since Emulsions 5 and 6 were prepared with a water soluble initiator and remained stable in Examples 10–27. In almost all cases the organic acid hydrolyzed latex resulted in excellent conversion of the amide group to an amine group without effecting substantial hydrolysis of the acetate group. Note the high ratio of amide to acetate hydrolysis; only from 1 to 4% of the acetate was hydrolyzed while from about 8 to 25% of the amide group was hydrolyzed.

EXAMPLE 54

Determination of Cationic Nature of Emulsion

This example was carried out in order to determine the cationic nature of the latex emulsions.

The product of the reaction summarized in Example 15 above was diluted to approximately 0.1% (w/w) solids and the Zeta potential measured on a Lazer Zee model 501 instrument in highly purified water. The instrument measured a surface Zeta potential of +21.5 mv; indicating the cationic nature of the particles. Additionally, the same sample was cleaned of excess salts by replacing the serum phase with highly purified water and a similar measurement was made. In this case, the instrument measured a Zeta potential of +7.8 mv.

EXAMPLES 55

Preparation of Paper Hand Sheets

The following procedure was used to evaluate the effectiveness of several of the above latex emulsion as additives in paper making.

Materials

Fiber—a 50/50 (w/w) blend of southern softwood/northern hardwood refined to a 625 CSF.

Example 55—No polymer added.

Example 56—The emulsion of Example 15 was used.

Example 57—The emulsion of Example 15 was used except with 30% of the NVF hydrolyzed to the amine salt resulting in a polymer with 1.62% amine character by the above calculations.

Example 58—The emulsion of Example 6 in unmodified form was used.

Example 59—The emulsion of Example 5 in unmodified form was used.

Hand sheet preparation

An appropriate amount of fiber slurry was measured out for a 2.5 gm hand sheet having a basic weight of 60 gm/m² and placed under agitation. The experimental emulsion sample was diluted with water and added to the fiber slurry resulting in a 5% add on based on dry emulsion and dry fiber. No adjustment to pH was made. The fiber and emulsion were mixed 3 minutes prior to hand sheet formation. Wet formed hand sheets were pressed at 50 psi on a hand sheet press and dried at 270° F. The hand sheets were conditioned for 24 hours under typical TAPPI conditions of temperature and humidity prior to testing. The results are shown in Table 4.

TABLE 4

Paper Tensile of Experimental Emulsions

| Sample | Wet Tensile (lb./inch) | Dry Tensile (lb./inch) |
|---|---|---|
| Example 55 - no additive | 0.42 | 1.89 |
| Example 56/Example 15 emulsion | 0.52 | 10.31 |
| Example 57/Example 56 emulsion - added hydrolysis | 1.5 | 8.89 |
| Example 58/Example 6 emulsion | 0.31 | 11.81 |
| Example 59/Example 5 emulsion | 0.32 | 12.75 |

These results show that in the unmodified form these emulsions offer little, if any, wet strength enhancement to paper but in the hydrolyzed form, were amine functionality is present they provide wet strength enhancement. This is clearly evidenced by Example 57 with 30% of the NVF hydrolyzed.

What is claimed is:

1. In a stable aqueous emulsion containing water insoluble, vinyl polymer particles said vinyl polymer particles formed by the emulsion polymerization of at least two ethylenically unsaturated monomers, the improvement wherein the vinyl polymer comprises from 1 to 20% by weight of polymerized N-vinylformamide units, and said polymerized N-vinylformamide units being hydrolyzed in a molar amount of from 8 to 30%.

2. The emulsion of claim 1 wherein the vinyl polymer particles are comprised of polymerized units of $C_{1-18}$ alkyl vinyl esters or $C_{1-18}$ alkyl esters of acrylic or methacrylic acid or both.

3. The emulsion of claim 2 wherein the alkyl vinyl ester is a $C_{1-4}$ alkyl ester.

4. The emulsion of claim 3 wherein the alkyl ester of acrylic or methacrylic acid is a $C_{1-8}$ alkyl ester of acrylic or methacrylic acid.

5. The emulsion of claim 4 wherein the polymer comprises polymerized units of a $C_{1-4}$ alkyl vinyl ester and the $C_{1-4}$ alkyl vinyl ester is present in an amount from 30 to 80 percent by weight of the vinyl polymer particle.

6. The emulsion of claim 5 wherein the polymer comprises polymerized units of a $C_{1-8}$ alkyl ester of acrylic or methacrylic acid and the $C_{1-8}$ alkyl ester of acrylic or methacrylic acid is present in an amount up to about 50 percent by weight of the vinyl polymer particle.

7. The emulsion of claim 6 wherein the alkyl vinyl ester is vinyl acetate.

8. The emulsion of claim 7 wherein units of ethylene are polymerized into the vinyl polymer particle in an amount of from 5 to 40 percent by weight.

9. The emulsion of claim 8 wherein the vinyl polymer particles are comprised of from 60 to 80% by weight vinyl acetate, 15 to 25% by weight ethylene and 2 to 15% by weight N-vinyl formamide.

10. In a process for producing a polymer containing amine functionality, the improvement for producing a stable latex containing said polymer containing amine functionality which comprises:

forming a polymer comprising from 1 to 20% by weight of polymerized units of N-vinylformamide by the emulsion polymerization of a water insoluble monomer system comprising N-vinylformamide;

hydrolyzing the polymer containing polymerized units of N-vinylformamide by contacting the polymer with an acid under conditions for converting from 8 to 30% by weight of the polymerized units of N-vinylformamide to amine groups, thereby forming a stable latex containing said polymer containing amine functionality.

11. The process of claim 10 wherein the polymer comprises units of a $C_{1-4}$ alkyl vinyl ester or a $C_{1-8}$ alkyl ester of acrylic or methacrylic acid or both.

12. The process of claim 10 wherein the polymer comprises units of a $C_{1-4}$ alkyl vinyl ester and the $C_{1-4}$ alkyl vinyl ester is present in an amount from 30 to 80 percent by weight of the vinyl polymer particle.

13. The process of claim 12 wherein a $C_{1-8}$ alkyl ester of acrylic or methacrylic acid is present and the $C_{1-8}$ alkyl ester of acrylic or methacrylic acid is present in an amount up to 50 percent by weight of the vinyl polymer particle.

14. The process of claim 13 wherein the alkyl vinyl ester is vinyl acetate.

15. The process of claim 14 wherein the acid used to effect hydrolysis is an organic acid selected from the group consisting of methane sulfonic acid, oxalic acid and paratoluene sulfonic acid.

* * * * *